US008817281B2

(12) United States Patent
Natori (10) Patent No.: US 8,817,281 B2
(45) Date of Patent: Aug. 26, 2014

(54) PRINT SETTING SERVER, DOCUMENT PROCESSING SERVER, PRINT SYSTEM, AND PRINT SETTING METHOD

(75) Inventor: Hideo Natori, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/393,179

(22) PCT Filed: Dec. 21, 2011

(86) PCT No.: PCT/JP2011/080541
§ 371 (c)(1),
(2), (4) Date: Feb. 28, 2012

(87) PCT Pub. No.: WO2012/105156
PCT Pub. Date: Aug. 9, 2012

(65) Prior Publication Data
US 2012/0194844 A1    Aug. 2, 2012

(30) Foreign Application Priority Data
Jan. 31, 2011  (JP) .................................. 2011-019146

(51) Int. Cl.
*G06F 3/12* (2006.01)
*H04L 29/08* (2006.01)

(52) U.S. Cl.
CPC ............ *G06F 3/1255* (2013.01); *G06F 3/1288* (2013.01); *G06F 3/1232* (2013.01); *G06F 3/1228* (2013.01); *G06F 3/1287* (2013.01); *H04L 67/025* (2013.01); *G06F 3/1205* (2013.01)
USPC ......................................... 358/1.13; 358/115

(58) Field of Classification Search
CPC ... G06F 3/1205; G06F 3/1228; G06F 3/1232; G06F 3/1255; G06F 3/1287; G06F 3/1288; H04L 67/025
USPC .................................. 358/1.1–1.9, 1.11–1.18
See application file for complete search history.

(56) References Cited

U.S. PATENT DOCUMENTS

| 2006/0001686 A1 | 1/2006 | Natori |
| 2009/0201540 A1 * | 8/2009 | Morooka ...................... 358/1.15 |
| 2009/0303547 A1 * | 12/2009 | Kurihara ...................... 358/3.28 |

FOREIGN PATENT DOCUMENTS

| JP | 2007-48303 A | | 2/2007 |
| JP | 2007-310702 | * | 11/2007 |
| JP | 2007-310702 A | | 11/2007 |

(Continued)

OTHER PUBLICATIONS

International Search Report dated Apr. 3, 2012 issued in international application No. PCT/JP2011/080541.

(Continued)

*Primary Examiner* — King Poon
*Assistant Examiner* — Ibrahim Siddo
(74) *Attorney, Agent, or Firm* — Fitzpatrick, Cella, Harper & Scinto (57) ABSTRACT

According to the present invention, a print setting server connectable with a document processing server is provided, where the print setting server provides a print setting screen that depends on functions of a printer model through the Web, and a detailed print setting screen that depends on a printer is provided to a client. The client can enter print settings through the print setting screen. In this manner, print setting depending on a printer model is realized in a cloud print service.

8 Claims, 7 Drawing Sheets

(56) References Cited

FOREIGN PATENT DOCUMENTS

| JP | 2007-328639 | * | 12/2007 |
| JP | 2007-328639 A | | 12/2007 |
| JP | 2009-54115 A | | 3/2009 |
| JP | 2009-157879 | * | 7/2009 |
| JP | 2009-157879 A | | 7/2009 |
| JP | 2009-163574 A | | 7/2009 |
| JP | 2009-301108 A | | 12/2009 |

OTHER PUBLICATIONS

"Google Cloud Print (Labs)", http://www.code.google.com/apis/cloudprint, last visited Oct. 13, 2010, now http://developers.google.com/cloud-print/, p. 1.

* cited by examiner

● COMMON PRINT SETTINGS

⬅ | ⊗ STOP | ⟳ REFRESH | ⌂ HOME | ADDRESS | http://app-saas-server/common-ui/

BASIC SETTINGS

| | |
|---|---|
| PAPER TYPE: | PLAIN PAPER ▼ |
| OUTPUTTING PAPER SIZE: | A4 ▼ |
| PRINT QUALITY: | STANDARD ▼ |
| N-in-1 PRINTING: | 2-in-1 ▼ |
| PRINT ORIENTATION: | PORTRAIT ▼ |
| PAPER FEED: | AUTOMATIC ▼ |
| THE NUMBER OF COPIES | 1 ▼ |
| PRINT IN UNITS OF COPIES: | DISABLED ▼ |
| BORDERLESS FULL-PAGE PRINTING: | WITH BORDERS ▼ |
| DOUBLE-SIDED PRINTING: | DISABLED ▼ |

ADVANCED SETTINGS

| | |
|---|---|
| N-in-1 PRINTING WITH FRAME LINES: | ENABLED ▼ |
| AMOUNT OF EXTENSION : | 1 ▼ |

[ OK ]  [ RESET TO DEFAULT ]

FIG. 6

PRINT SETTING SERVER, DOCUMENT PROCESSING SERVER, PRINT SYSTEM, AND PRINT SETTING METHOD

TECHNICAL FIELD

The present invention relates to a print setting server, a document processing server, a print system, and a print setting method for networked printing.

BACKGROUND ART

Connecting computers with printers over a network allows each computer to use each printer via the network. In this regard, a technique is known such that a user of a client computer uses a Web browser to enter print settings through a Web-page user interface (hereinafter abbreviated as a Web UI) provided by a server computer.

In a case that a document created with an application running on a client computer is printed, an outputting printer is selected, print settings are entered with a Web browser and the document is sent to a server computer via the Web browser. In the server computer, a print application reads the document and uses the print settings information to issue a rendering instruction for printing. A printer driver executed on the server computer converts the rendering instruction into a print instruction interpretable by the outputting printer and sends the print instruction to the outputting printer. The outputting printer performs print operations according to the received print instruction. In this manner, conventionally a desired printed document can be obtained (for example, see Japanese Patent Laid-Open No. 2007-328639).

Figure 6:
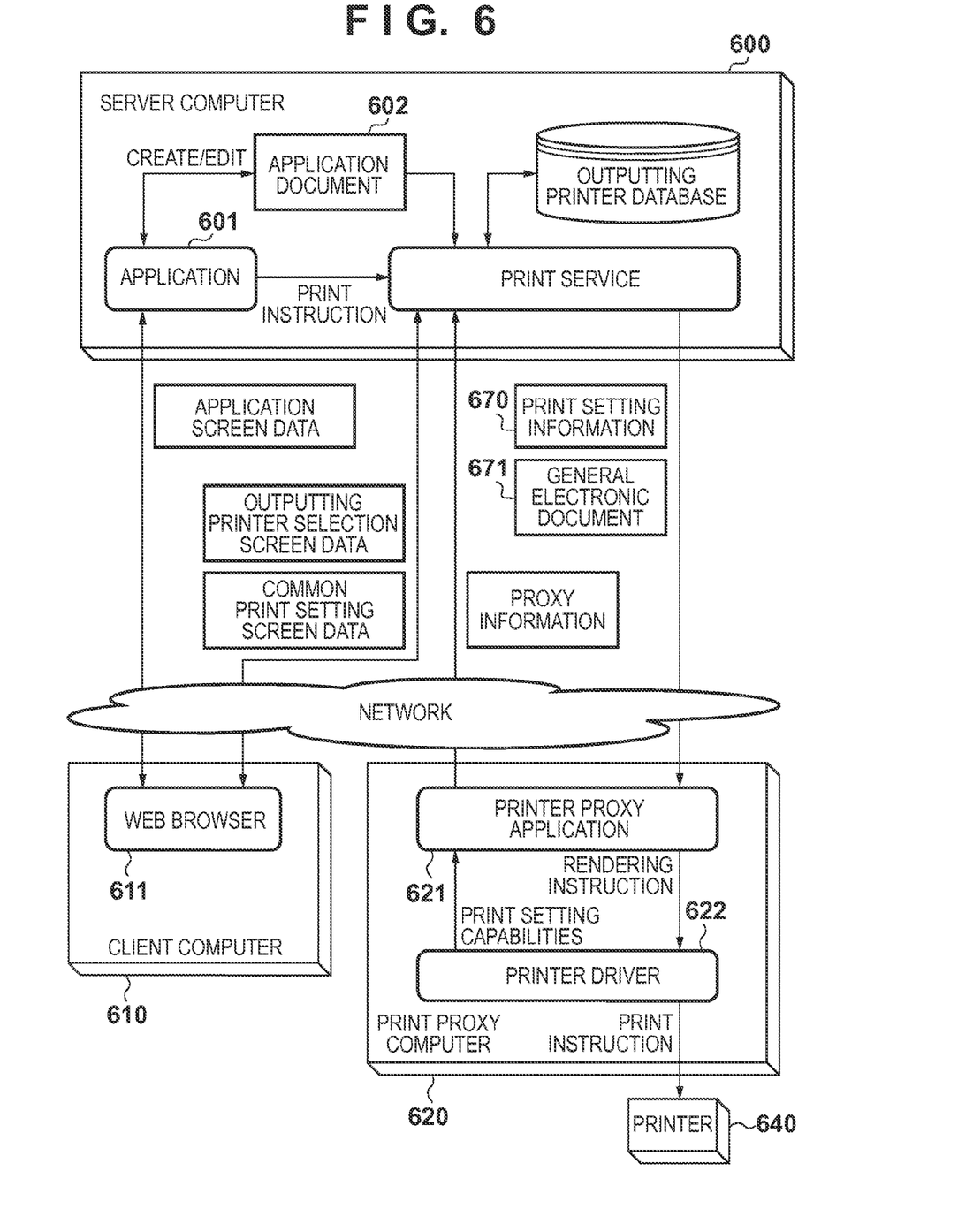
FIG. 6 is a block diagram showing an exemplary configuration of a network print system in conventional art.

In cloud computing such as SaaS (Software as a Service), applications run on a server computer and a user of a client computer uses the applications through a Web browser. Here, description will be given using a block diagram shown in FIG. 6 for a case called cloud printing, in which a document created with an application running on a server computer is printed. First, through a Web browser on a client computer, printing is instructed to the application, an outputting printer is selected, and print settings are entered. The server computer converts the application document into a general electronic document format such as PDF (Portable Document Format) and sends the converted document along with the print settings information to a print proxy computer. A print proxy application 621 running on the print proxy computer issues a rendering instruction based on the received print setting information and electronic document. A printer driver executed on the print proxy computer converts the rendering instruction into a print instruction interpretable by the outputting printer and sends the print instruction to the outputting printer. The outputting printer performs print operations according to the received print instruction. In this manner, conventionally a desired printed document can be obtained (for example, see Google code, "Google Cloud Print (Labs)", retrieved on Oct. 13, 2010, URL: http://code.google.com/apis/cloudprint/).

Unfortunately, such conventional approaches involve a first inconvenience: print setting items related to characteristic functions of each printer cannot be provided in a user-friendly form on a Web UI for entering print settings. This is because, with a common Web UI applicable to various printers, it is difficult to display functions characteristic of a specific printer model together as a group, or to preferentially display frequently used print setting items. For example, a function called borderless printing is to perform printing with no borders along the edges of a print sheet. Another function is to print two pages of a document on one sheet with a layout called 2-in-1. Borderless printing is often set when an image is printed, while 2-in-1 is often set when a document of many pages is printed. Since these setting items are frequently set, displaying these setting items together with high priority on a Web UI would improve the operability in print setting.

In the cloud computing described above, the server computer obtains print setting capability information from the print proxy computer. The print setting capability information is a set of setting items that should be included in the print setting information and setting values settable for each setting item. The print setting capability information does not include display priority and information for displaying certain print setting items together. Consequently, for example, a common Web UI may take a form that simply lists setting items. It is difficult to provide a Web UI that displays certain setting items together depending on a factor such as printer model, or that preferentially displays particular setting items.

Given a detailed knowledge of functions of printers to be used, certain print setting items could be displayed together in the Web UI. However, a software vendor that provides cloud computing is different from hardware vendors that manufacture printers and therefore does not have a detailed knowledge of the printers. Further, printers of various models manufactured by various vendors are on the market, and there is a wide choice of printers. In the light of these facts, changing the print setting screen depending on the outputting printer is unrealistic and the Web UI can only provide a printer-independent common print setting screen.

In the above-described case in which the printer driver running on the serer computer is used for printing, characteristic print setting items corresponding to the outputting printer cannot be provided in a user-friendly form unless a Web application for generating the Web UI is changed depending on the outputting printer. However, considering that various printers are on the market, changing the Web application for generating the Web page UI depending on the outputting printer is unrealistic and the Web UI actually cannot provide characteristic print setting items of the printer in a user-friendly form.

In addition to the first inconvenience, the conventional approaches also involve a second inconvenience: the Web UI of a print setting screen does not allow entering print settings while maintaining consistency of the print settings, leading to a print result that does not conform to the enter print settings. This occurs because contradictory setting values can be entered for two or more print setting items. Take an example of the setting item "the type of printing paper" and the setting item "double-sided printing." It would be preferable to control the display on the print setting screen so that the user can enable double-sided printing only when the user selects printing paper capable of double-sided printing on the print setting screen. However, in conventional art, since only the printer driver has priority among setting items and adjusts consistency, the Web UI cannot maintain the consistency of print settings with respect to the user's entry. As a result, the printer driver adjusts the consistency of print settings when the print proxy application performs printing, and this causes the second inconvenience, i.e., printing is performed according to print settings different from user-entry print settings.

SUMMARY OF INVENTION

Accordingly, the present invention enables providing a user with a Web UI that displays certain print setting items related to characteristic functions of a printer together as a group and that also allows print settings to be entered while maintaining the consistency of the print settings.

To solve the above object, a print system according to the present invention has the following configuration.

According to one aspect of the present invention, a print setting server capable of communicating with a client device and with a document processing server that manages document data, comprises: receiving means for receiving, from the document processing server, print environment information about an outputting print device specified according to a print instruction for the document data from the client device; providing means for providing advanced print setting screen data corresponding to the print environment information to the client device; and supplying means for supplying, to the document processing server, print setting information entered through an advanced print setting screen displayed on the client device according to the advanced print setting screen data.

According to another aspect of the present invention, a print setting method in a print setting server capable of communicating via a network with a client device and with a document processing server that manages document data, comprises: a receiving step of receiving, from the document processing server, print environment information about an outputting print device specified according to a print instruction for the document data from the client device; a providing step of providing advanced print setting screen data corresponding to the print environment information to the client device; and a supplying step of supplying, to the document processing server, print setting information entered through an advanced print setting screen displayed on the client device according to the advanced print setting screen data.

According to still another aspect of the present invention, a document processing server on which an application that processes document data under instructions from a client device runs and on which the document data is managed, comprises: acquiring means for acquiring print environment information about an outputting print device specified according to a print instruction for the document data from the client device; sending means for sending the acquired print environment information to a print setting server; receiving means for receiving, from the print setting server, print setting information acquired by the print setting server providing advanced print setting screen data corresponding to the print environment information to the client device; and outputting means for outputting the document data instructed to be printed and the received print setting information for printing with the outputting print device.

According to yet another aspect of the present invention, a print setting method in a document processing server on which an application that processes document data under instructions from a client device runs and on which the document data is managed, comprises: an acquiring step of acquiring print environment information about an outputting print device specified according to a print instruction for the document data from the client device; a sending step of sending the acquired print environment information to a print setting server; a receiving step of receiving, from the print setting server, print setting information acquired by the print setting server providing advanced print setting screen data corresponding to the print environment information to the client device; and an outputting step of outputting the document data instructed to be printed and the received print setting information for printing with the outputting print device.

According to still yet another aspect of the present invention, a print system comprises a client device, a document processing server on which an application that processes document data under instructions from the client device runs and on which the document data is managed, and a print setting server, the document processing server comprising: acquiring means for acquiring print environment information about an outputting print device specified according to a print instruction for the document data from the client device; sending means for sending the acquired print environment information to the print setting server; receiving means for receiving, from the print setting server, print setting information acquired by the print setting server providing advanced print setting screen data corresponding to the print environment information to the client device; and outputting means for outputting the document data instructed to be printed and the received print setting information for printing with the outputting print device, the print setting server comprising: receiving means for receiving the print environment information about the outputting print device from the document processing server; providing means for providing the advanced print setting screen data corresponding to the print environment information to the client device; and supplying means for supplying, to the document processing server, the print setting information entered through an advanced print setting screen displayed on the client device according to the advanced print setting screen data.

According to yet still another aspect of the present invention, a print setting method in a print system comprising a client device, a document processing server on which an application that processes document data under instructions from the client device runs and on which the document data is managed, and a print setting server, comprises: in the document processing server, an acquiring step of acquiring print environment information about an outputting print device specified according to a print instruction for the document data from the client device; a sending step of sending the acquired print environment information to the print setting server; a receiving step of receiving, from the print setting server, print setting information acquired by the print setting server providing advanced print setting screen data corresponding to the print environment information to the client device; and an outputting step of outputting the document data instructed to be printed and the received print setting information for printing with the outputting print device; and in the print setting server, a receiving step of receiving the print environment information about the outputting print device from the document processing server; a providing step of providing the advanced print setting screen data corresponding to the print environment information to the client device; and a supplying step of supplying, to the document processing server, the print setting information entered through an advanced print setting screen displayed on the client device according to the advanced print setting screen data.

According to the present invention, certain print setting items can be displayed together as a group depending on functions provided by a printer. Further, particular print setting items can be preferentially displayed. Also, a Web page UI that allows entering print settings while maintaining the consistency of the print settings can be provided to a user.

Further features of the present invention will become apparent from the following description of exemplary embodiments with reference to the attached drawings.

DESCRIPTION OF EMBODIMENTS

With reference to the accompanying drawings, preferable embodiments of the present invention will be described in detail below. The following embodiments are not intended to limit the present invention set forth in claims, and not all combinations of features described in the embodiments are necessarily required for solutions of the present invention.

First Embodiment

Configuration of Network System

Figure 1:
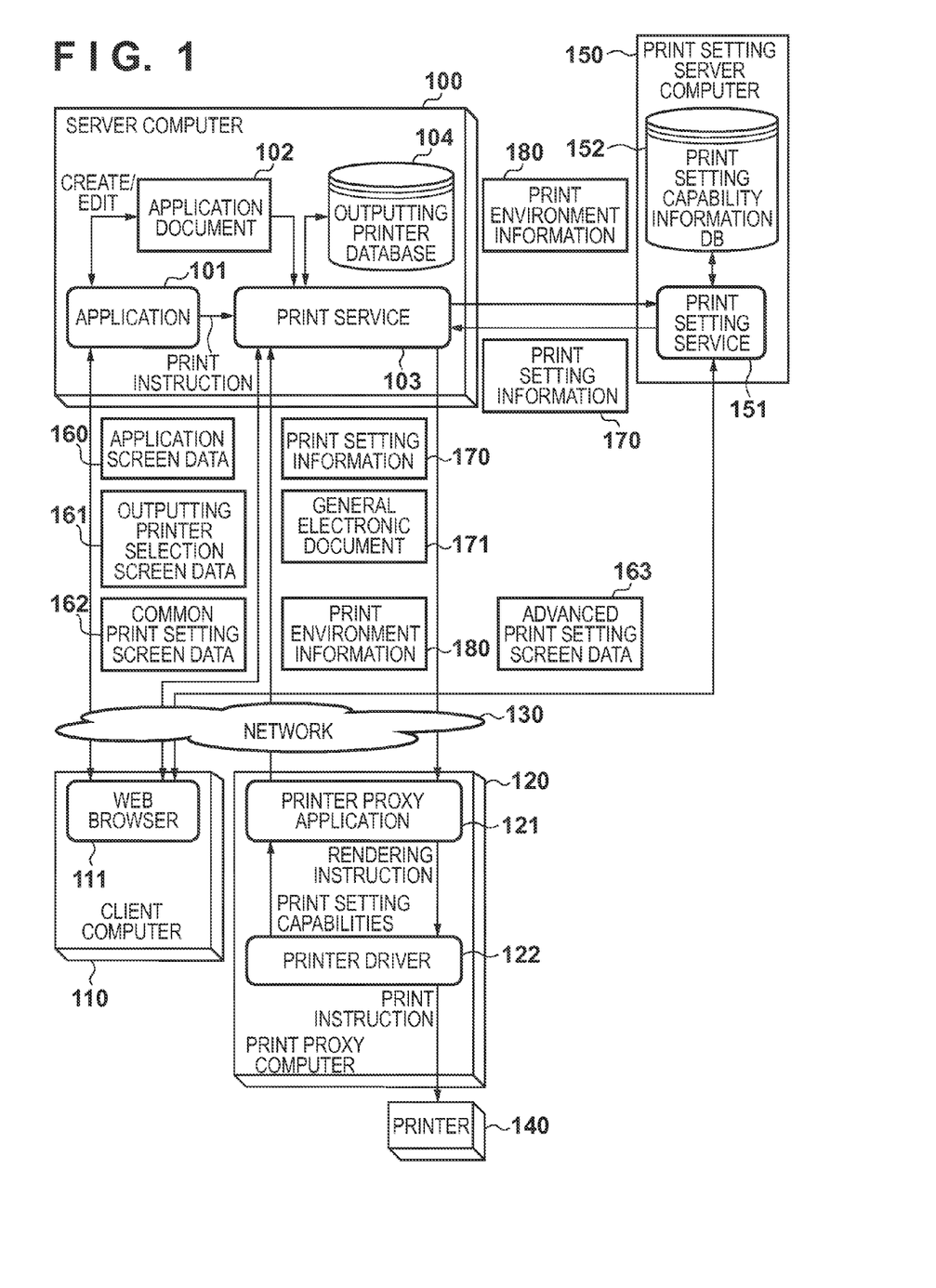
FIG. 1 is a block diagram showing an exemplary configuration of a network print system in a first embodiment.

FIG. 1 is a block diagram showing an exemplary configuration of a network print system in this embodiment. As shown in FIG. 1, the network print system includes a server computer (a server) 100 that is a document processing server, a client computer (a client or a client device) 110, a print proxy computer 120, a printer 140, and a print setting server computer (a print setting server) 150. The server 100, the client 110, the print proxy computer 120, and the print setting server 150 are interconnected by a network 130 and can communicate with each other. The printer 140 is connected with the print proxy computer 120 through some interface, either wired or wireless, and can receive at least print data supplied from the print proxy computer 120.

The client 110 executes a Web browser 111. Various sorts of screen data supplied to the client 110 are displayed by the Web browser 111 on the client device. A user of the client 110 can operate various screens through the Web browser 111.

The server 100 executes an application 101, a print service 103, and a maintenance and search program for an outputting printer database 104. The application 101 is what is called a Web application that supplies application screen (UI screen) data 160 to the client 110 to thereby provide functions of creating, editing, saving, and printing an application document 102, i.e., document data. The server 100 stores and manages document data to be processed by the application 101 in storage means (not shown) internal or external to the server 100. The outputting printer database 104 is managed by the server 100 in this embodiment. The outputting printer database 104 is a database of information on outputting printers available to each user, and print environment information 180 supplied from each printer and from the print proxy computer 120 to which the printer is connected. The information on outputting printers includes information indicating a name (identifier), model, serial number, and manufacturer for identifying the printer. For example, if an identifier of a user is entered to search for printer names, then printer names available to the user are returned. The print environment information 180 includes printer information, for example, information such as identifiers for identifying the printer (such as information indicating a model, serial number, and manufacturer) and the location of the printer. The print environment information 180 includes information for identifying functions provided by the printer. In addition, the print environment information 180 includes, for example, the address of a print setting server that manages a print setting capability information database of the printer.

The print service 103 is software that provides a print service to the application 101. The print service 103 supplies outputting printer selection screen data 161 to the client 110 to thereby provide a capability of selecting an outputting printer. The print service 103 also supplies common print setting screen data 162 to the client 110 to thereby provide a capability of entering print settings through a common print setting screen. On the common print setting screen, common print settings (such as specifying the number of copies) commonly supportable by any printer can be made. The print service 103 uses the print setting server 150 corresponding to the printer 140 to obtain print setting information 170 through an advanced print setting screen. On the advanced print setting screen, print settings (such as color, double-sided, and binding) dependent on the outputting printer can be made. The print service 103 supplies, to the print proxy computer 120, a general electronic document 171 in a general document format resulting from converting the application document 102, and the print setting information 170. The general document format here refers to a format that can be processed by general software and printer drivers, such as PDF (Portable Document Format) or EMF (Enhanced Metafile).

The print setting server 150 executes a print setting service 151 and a maintenance and search program for a print setting capability information database 152. Advanced print setting screen data 163 is provided by the print setting service 151. The print setting service 151 has a function of providing the advanced print setting screen data 163 to the client 110. The print setting capability information database 152 stores print setting capability information on the printer 140, the priority and group information on setting items required for displaying the advanced print setting screen, and rule information for maintaining the consistency of print settings. The rule information is, for example, information to be used for evaluation for maintaining the consistency among setting values of print setting items used as print setting information. The print setting capability information is information indicating setting items settable for the printer or printer driver and setting values settable for each setting item. If the user changes a setting value of a print setting item, the print setting service 151 can use information stored in the print setting capability information database 152 to update the advanced print setting screen data 163.

The print proxy computer 120 executes a print proxy application 121 and a printer driver 122. The print proxy application 121 has a function of supplying the print environment information 180 to the server 100. The print environment information 180 includes information on the type of operating system (OS) of the print proxy computer 120, manufacturer information and the model of the printer 140, the print setting capability information on the printer 140 or the printer driver 122, and information on the printer driver 122. The print proxy application 121 uses the print setting information 170 supplied from the server 100 to supply a rendering instruction for printing the content of the general electronic document 171 to the printer driver 122. The printer driver 122 converts the supplied rendering information into a print instruction interpretable by the printer 140 and supplies the print instruction to the printer 140.

The printer 140 performs print operations according to the received print instruction and forms an image on printing paper.

The print setting service 151 and the print setting capability information database 152 operating on the print setting server 150 are preferably provided by a hardware vendor that manufactured the printer 140 and the printer driver 122. Being conversant with functions of the printer 140, the hardware vendor can provide the above-described rule information, and the advanced print setting screen data 163 suitable for the printer 140. Accordingly, besides the system shown in FIG. 1, the present invention also contemplates application to a system that includes a number of print setting servers provided by hardware vendors that manufactured various printers and printer drivers. In that case, there may be a number of printer drivers 122 and printers 140, although they are each shown as a single entity in FIG. 1. Also in that case, in response to a print instruction from the client, the server 100 communicates with a print setting server provided by a hardware vendor identified from information such as information indicating the manufacturer of an outputting printer contained in the print environment information.

In addition, several users may share one printer. Accordingly, although FIG. 1 shows only one client 110, there may be a number of clients 110. Also, a user may use several applications. Accordingly, although FIG. 1 shows only one server 100, there may be a number of servers 100.

The application screen data 160, the outputting printer selection screen data 161, the common print setting screen data 162, and the advanced print setting screen data 163 are data, such as HTML data, that represents respective enter screens in a form easily viewable by the user.

The server 100 and the print setting server 150 execute Web server software (not shown). The Web server software receives a URL from Web client software and, in response to a request described in the URL, sends data in HTML or in other forms as a processing result to the Web client software according to HTTP. HTML is an abbreviation of Hyper Text Markup Language, URL is an abbreviation of Uniform Resource Locator, and HTTP is an abbreviation of Hyper Text Transfer Protocol. The Web browser 111 running on the client 110 is a kind of Web client software. In this manner, various sorts of screen data are sent to the client 110.

[Overview of Network System Operation]

The print setting server 150 provides a Web API for supplying the advanced print setting screen data, and the print service 103 uses the Web API. API is an abbreviation of Application Programming Interface. The print service 103 supplies the print environment information to the Web API of the print setting server 150 and obtains a URL for the advanced print setting screen in response. The print service 103 uses this URL (for example, passes the URL to the client) to cause the advanced print setting screen data 163 to be sent to the client 110 and causes the user to enter advanced print settings.

The server 100 provides a Web API for receiving the print setting information 170, and the print setting service 151 uses the Web API. Once the user of the client 110 finishes entering the advanced print settings, the print setting service 151 supplies the print setting information 170 to the Web API of the server 100. In this manner, the print service 103 can obtain the consistent print setting information 170 and use it for printing.

The print setting information 170 may be data in any format that can be reflected as print settings in a print result. For example, the print setting information 170 may be a PrintTicket document, interpretable by the printer driver 122, compliant with Print Schema specifications. Of course, the print setting information 170 may be in a data format that can be directly interpreted by the printer 140. As another example, the print setting information 170 may be in a format interpretable by the printer proxy application 121, in which case the printer driver 122 may be informed of the settings.

The print setting capability information included in the print environment information 180 is a set of print setting items in print settings corresponding to the functions of the printer 140 and setting values settable for each print setting item. The print setting capability information may be data in any format that can be reflected in the print setting information 170. For example, the print setting capability information may be a PrintCapabilities document compliant with the Print Schema specifications.

The print proxy application 121 may actively operate when the server 100 supplies the print setting information 170 and the general electronic document 171 to the print proxy application 121. For example, the print proxy application 121 polls the server 100 to detect the presence of a document to be printed.

[Print Setting and Print Processing Procedure]

Figure 2A:
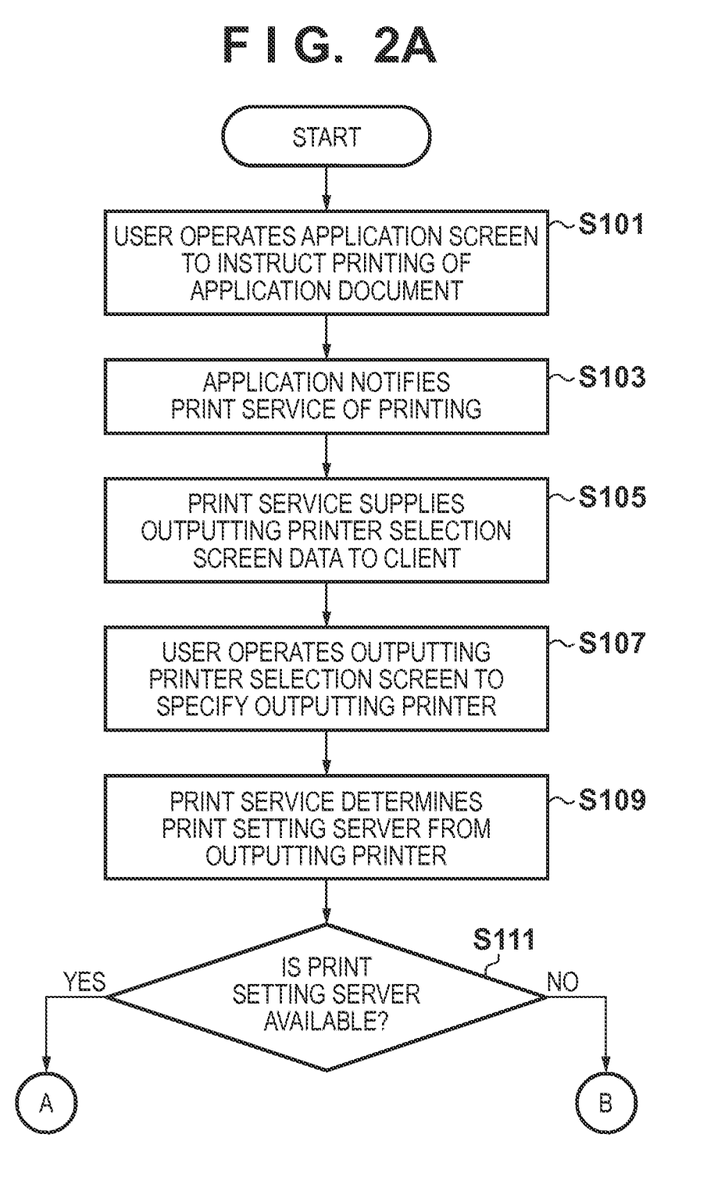
FIG. 2A is a flowchart showing print processing in the first embodiment.
Figure 2B:
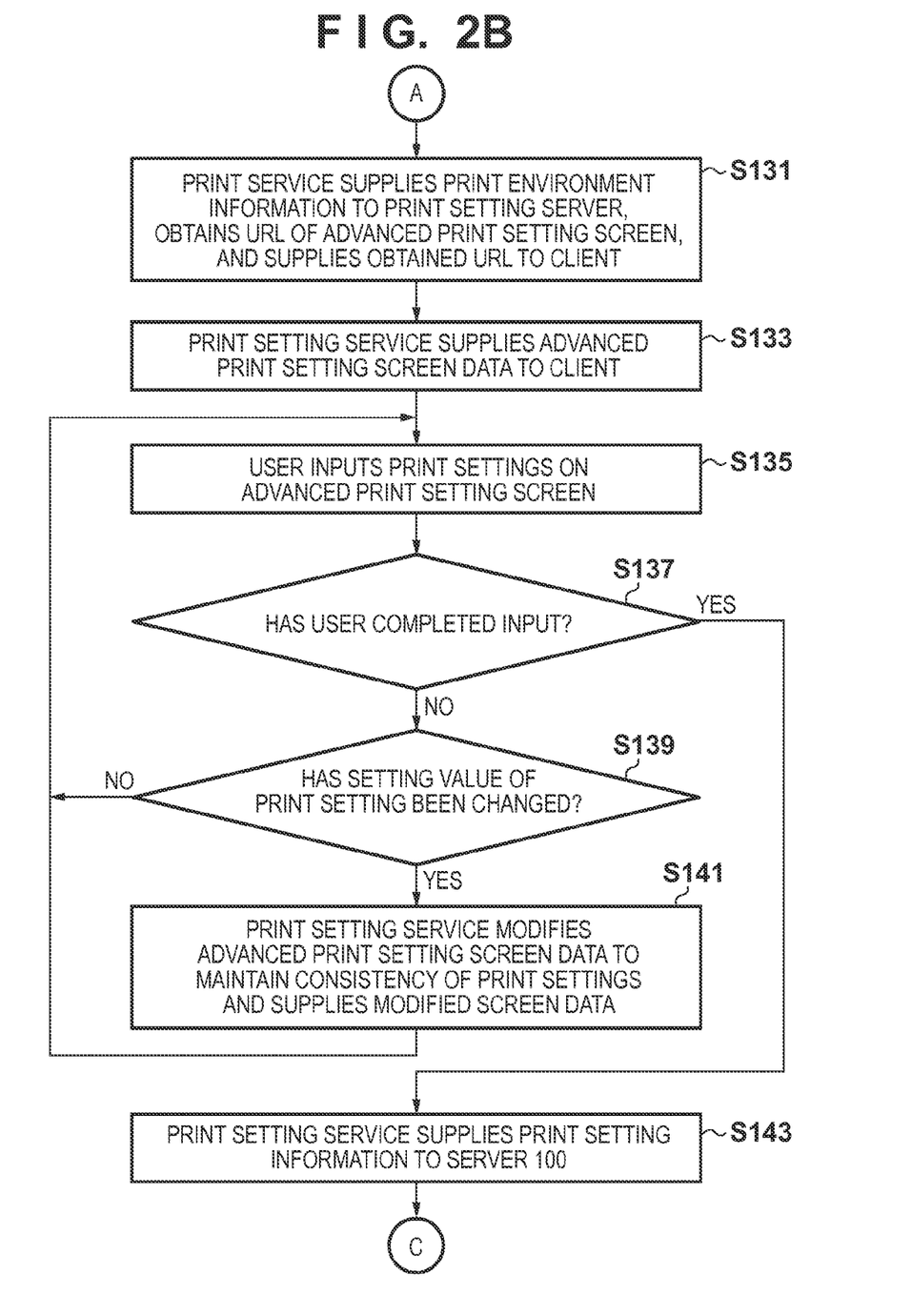
FIG. 2B is a flowchart showing the print processing in the first embodiment.
Figure 2C:
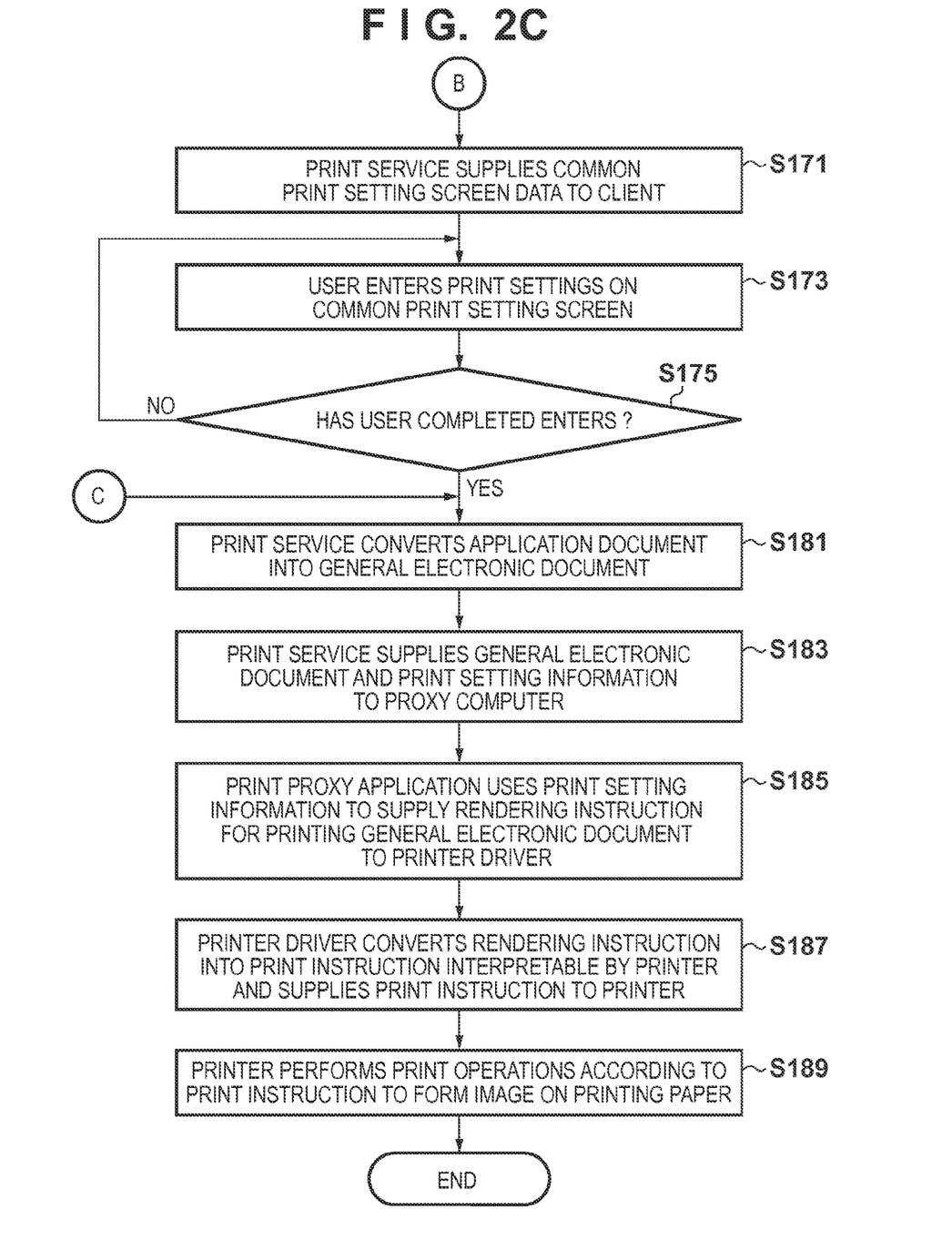
FIG. 2C is a flowchart showing the print processing in the first embodiment.

Next, the flow of print processing, including entry of print settings, will be described using FIGS. 2A, 2B, and 2C. FIGS. 2A to 2C are flowcharts showing print processing in the first embodiment. Here, to clarify the flow of the print processing, the description will be given with respect to the entire system.

The server 100 provides the screen data 160 of the application 101 to the client 110 through the Web service, and the user of the client 110 can operate the application 101 through the Web browser 111. First, in S101, the user of the client 110 provides a print instruction to the application 101 for printing the created and edited application document 102. In S103, the application 101 notifies the print service 103 of the instruction to print the application document 102 along with user information.

In S105, the print service 103 queries the outputting printer database 104 to obtain a list of outputting printers available to the user. The print service further generates the outputting printer selection screen data 161 from the list and provides it to the client 110. In S107, the user of the client 110 operates the outputting printer selection screen through the Web browser 111 and selects the outputting printer 140. The print service is notified of the selected printer 140.

In S109, the print service 103 determines the print setting server 150 that is to provide the advanced print setting screen for the printer 140. Specifically, this determination is made with reference to information (e.g., vendor information and model information, or address information) for identifying the print setting server corresponding to the selected outputting printer, included in the print environment information 180. As described above, hardware vendors that manufactured various printers could provide their respective print setting servers 150.

In S111, it is checked whether the determined print setting server 150 is available. If available, the process moves to S131. Otherwise, the process moves to S171. For example, the determination of the availability may be based on the presence or absence and the content of a response to a message sent to the determined print setting server for confirming whether the print setting server is alive.

S131 to S143 are a sub-flow in which the print service 103 obtains the print setting information from the print setting server 150. First, in S131, the print service 103 requests the print setting server 150 to provide the advanced print setting screen data. At this point, the print service 103 supplies part or all of the information included in the print environment information 180 to the print setting server 150. The supplied print environment information includes information necessary for identifying print settings unique to the printer to be used, for example at least the model number of the printer to be used. Although not directly related to the printer, information related to the environment in which the printer is used may also be included, such as information identifying frequently set items. The print setting service 151 of the print setting server 150 returns, to the server 100, the URL for supplying data on the advanced print setting screen for the outputting printer 140. The print service 103 supplies the URL returned from the print setting server 150 to the client 110. In S133, the client 110 accesses this URL. The print setting service 151 in turn uses information included in the print environment information 180 and information stored in the print setting capability information database 152 to generate the advanced print setting screen data 163 and supply it to the client 110. The client 110 displays a setting screen corresponding to the advanced print setting screen data 163 in the Web browser 111. The advanced print setting screen data 163 may not be generated each time it is supplied. Rather, the advanced print setting screen data may be generated and stored in advance in association with information that can identify the functions of the corresponding printer, for example the model number of the printer, and the stored advanced print setting screen data may simply be provided in step S151. Also, the advanced print setting screen data may be stored in association with information that can identify the functions of the printer when the advanced print setting screen data is first generated.

In S135, the user of the client 110 operates the advanced setting screen through the Web browser 111 to enter print settings. In S137, the print setting service 151 determines whether the user has completed entering the print settings. If so, the process moves to S143. Otherwise, the process moves to S139. The completion of the enter can be determined from a press on a complete button on the Web UI, for example. In S139, the print setting service 151 determines whether the user has changed a setting value of a setting item of the print settings. If so, the process moves to S141. Otherwise, the process returns to S135. In S141, the print setting service 151 updates the advanced print setting screen data to maintain the consistency of the print settings, and supplies the updated screen data to the client. At this point, the changed setting item is preferably displayed to the user in a visually noticeable form. The determination of the consistency among the setting items may be made by, for example, having data on a list of combinations of inconsistent setting values for each setting item in advance and determining whether or not any of the combinations of item values in the list is present. For each combination of inconsistent setting item values, a prioritized item may be predetermined, or a prioritized item may be determined from the use environment. Then the value of a subordinated item may be changed to be consistent with the value of the prioritized item. The process returns to S135, where the user continues inputting the print settings by operating the updated advanced print setting screen.

When the user of the client 110 has completed inputting the print settings and the print setting service 151 is notified of the completion, in S143, the print setting service 151 supplies the entered print setting information 170 to the server 100, which has requested the URL of the advanced print setting screen. The process then moves to S181.

S181 to S189 is a sub-flow in which the print setting information 170 set by the user is used to print the application document 102 with the printer 140. Once the print service 103 receives the print setting information 170 from the print setting server 150, in S181, the print service 103 converts the application document 102 into the general electronic document 171 such as PDF. In S183, the print service 103 outputs the print setting information 170 and the general electronic document 171 to the print proxy computer 120. In S185, the print proxy application 121 uses the received print setting information 170 to supply a rendering instruction for printing the general electronic document 171 to the printer driver 122. In S187, the printer driver 122 converts the rendering instruction issued by the print proxy application 121 into a print instruction interpretable by the printer 140 and supplies the print instruction to the printer 140. In S189, the printer 140 performs print operations according to the print instruction to form an image on printing paper.

S171 to S175 is a sub-flow in which the print service 103 obtains the print setting information if the print setting server 150 determined in S109 is unavailable. If the print setting server 150 is unavailable, a common print setting screen is provided to the user as in conventional art. First, in S171, the print service 103 provides the common print setting screen data 162 independent of the printer 140 to the client 110. In S173, the user of the client 110 operates the common print setting screen through the Web browser 111 to enter print settings. In S175, the print service 103 determines whether the user has completed entering the print settings. If so, the process moves to S181. Otherwise, the process moves to S173.

Information for associating the instruction to print the application document 102 issued by the user of the client 110 with the print setting information 170 is also used between the server 100 and the print setting server 150. For example, in S131, the print service 103 assigns a unique print instruction number to the print instruction and supplies the print instruction number to the print setting server 150. In S143, the print setting service 151 can supply the print instruction number along with the print setting information 170 to the server 100. In this manner, the print instruction can be associated with the print setting information 170.

[Exemplary UI]

Figure 3:
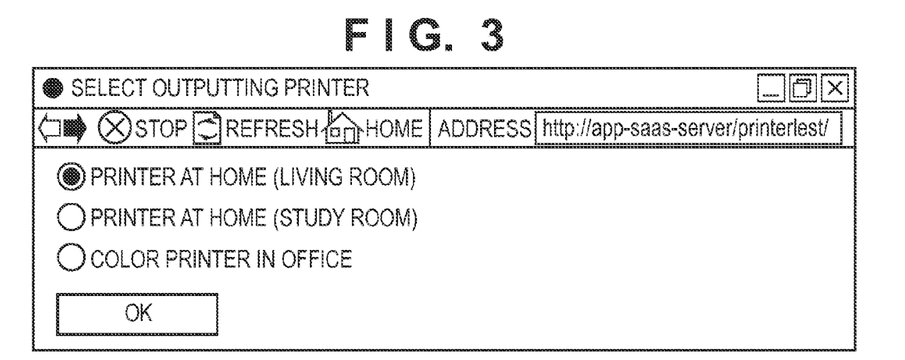
FIG. 3 is a diagram showing an example of an outputting printer selection screen displayed in a Web browser 111.

FIG. 3 is a diagram showing an example of the outputting printer selection screen displayed in the Web browser 111 on the client 110. As shown in FIG. 3, the user of the client 110 can view a list of available outputting printers on the screen of the Web browser 111. The user of the client 110 can select the printer 140 to be used for printing the application document 102 from the list.

Figure 4:
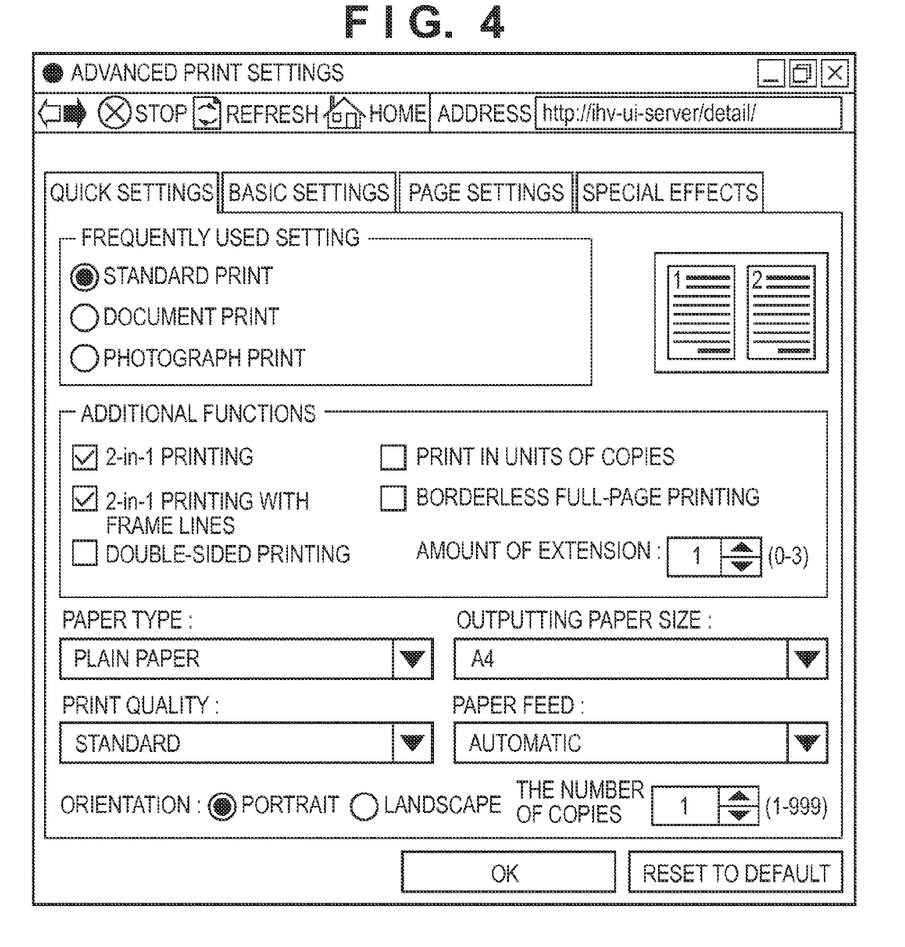
FIG. 4 is a diagram showing an example of an advanced print setting screen displayed in the Web browser 111.

FIG. 4 is a diagram showing an example of the advanced print setting screen displayed in the Web browser 111. As shown in FIG. 4, a print setting entry screen similar to a printer driver UI can be displayed in the Web browser 111 to cause the user to enter print settings for use at the time of printing. That is, frequently entered setting items can be preferentially displayed, and print settings for functions characteristic to the printer 140 can be displayed as a group. Such a setting screen may be generated in advance to be similar to a printer driver UI and stored in the print setting server, for example.

When the user of the client 110 changes the setting value of a certain print setting, the advanced print setting screen is updated to maintain the consistency of the print settings. For example, when the setting value of the setting item "double-sided printing" is changed from OFF to ON, the advanced print setting screen is updated so that setting values incompatible with double-sided printing among setting values for the setting item "paper type" are not displayed. In this manner, selectable setting values for certain setting items are increased or decreased in response to the user's entry, so that the user can continue entering the print settings with the consistency of the print setting information maintained. Although the consistency among the setting items is maintained by the print setting server in the description for FIGS.

2A to 2C, the consistency may be maintained with a script sent along with the advanced print setting screen data to the client, for example.

Figure 5:
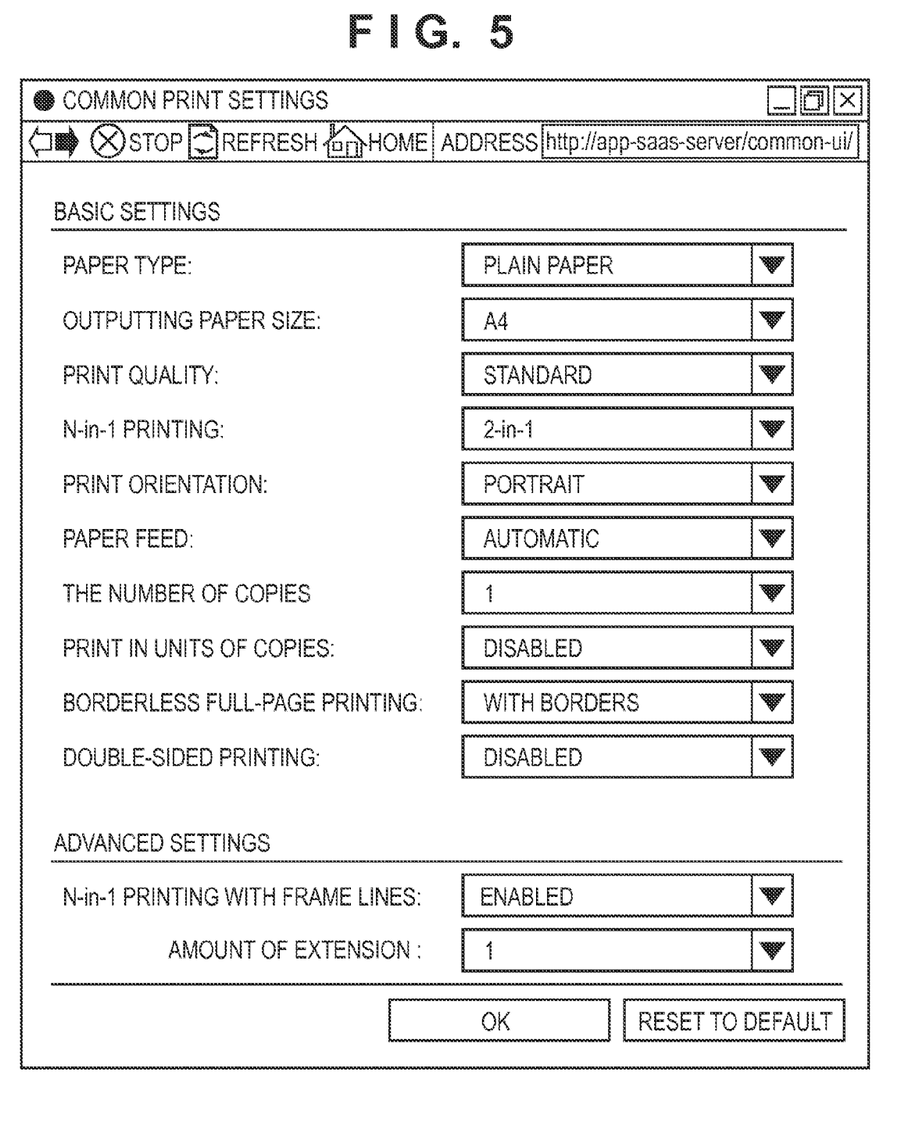
FIG. 5 is a diagram showing an example of a common print setting screen displayed in the Web browser 111.

FIG. 5 is a diagram showing an example of the common print setting screen displayed in the Web browser 111. As shown in FIG. 5, the common print setting enter screen can be displayed in the Web browser 111 to cause the user to enter print settings for use at the time of printing. Here, print setting items included in the print setting capability and setting values settable for each print setting item are displayed. Primary setting items among setting items settable for various printers are displayed together as basic settings, while other setting items are displayed together as advanced settings. Here, setting items that relate to functions characteristic to the printer and are therefore not common are displayed as the advanced settings, so that these setting items cannot be grouped into the primary setting items nor given higher display priority.

The print setting information entered on the common print setting screen may not be consistent. If the print setting information 170 received by the print proxy application 121 is not consistent, the printer driver changes setting values to maintain the consistency of the print setting information 170. The print settings changed by the printer driver cannot be checked by the user before printing. Consequently, the print setting information entered by the user is different from the print setting information to be used in actual printing. For example, when the setting value of double-sided printing is ON while the setting value of paper type is a type incapable of double-sided printing, printing is performed with the setting value(s) of either one or both of the setting items "double-sided printing" and "paper type" changed.

In this embodiment, PDF is taken as an example of the general electronic document 171. Alternatively, each page of the application document 102 may be converted into an image in a format such as JPEG (Joint Photographic Experts Group).

In this embodiment, the server 100 obtains the URL of the advanced print setting screen from the print setting server 150 and supplies the URL to the client 110. Alternatively, the server 100 may obtain the advanced print setting screen data 163 and supply the obtained advanced print setting screen data 163 to the client 110.

In this embodiment, the print proxy computer 120 including the print proxy application 121 and the printer driver 122 is described as a separate entity for generating the print instruction interpretable by the printer 140. Alternatively, the print proxy computer 120 may not intervene if the printer 140 can connect to the network, provide the print environment information 180, and perform printing with the print setting information 170 and the general electronic document 171. In this case, the printer returns the print environment information.

In this embodiment, the server 100 and the print setting server 150 are described as separate entities. Alternatively, the server 100 may take the functions of the print setting server 150. In this case, the server 100 includes the print setting service 151 and the print setting capability information database 152. Since the print environment information 180 and the print setting information 170 are now processed in the server 100, an API call other than a Web API, or inter-process communication, may be used to supply the information. It is noted that, in this case, rewording the print setting server as a print setting service will facilitate understanding of FIGS. 2A to 2C and the relevant description. Even if the both servers are embodied as the same computer, each server is an independent module and the implementation of the present invention still involves inter-server communication as described in FIGS. 2A to 2C. In this case, "communication" includes not only communication over the network but also communication without intervention of a physical network, such as inter-process communication.

In this embodiment, the server 100 and the print setting server 150 are described as servers. However, they may be computers capable of providing their respective functions, that is, information processing apparatuses.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-019146, filed Jan. 31, 2011, which is hereby incorporated by reference herein in its entirety.

The invention claimed is:

1. A document processing server on which an application that processes document data under instructions from a client device runs and on which the document data is managed, comprising:

an acquiring unit which acquires print environment information about an outputting print device specified according to a print instruction for the document data from the client device, wherein the print environment information includes identification information of the outputting print device and print setting capability information;

a sending unit which sends the acquired print environment information to a print setting server;

a receiving unit which receives, from the print setting server, print setting information acquired by the print setting server providing advanced print setting screen data corresponding to the print environment information to the client device; and an outputting unit which outputs the document data instructed to be printed and the received print setting information for printing with the outputting print device, wherein each of print setting servers is provided by a different one of a plurality of print device manufacturers, and the sending unit refers to the identification information for identifying a print setting server provided by a manufacturer of the outputting print device included in the print environment information and sends the print environment information to the identified print setting server from the print setting servers.

2. The document processing server according to claim 1, wherein the application is a Web application that processes the document data under instructions provided through a Web browser on the client device.

3. The document processing server according to claim 1, wherein the outputting unit outputs the document data in a data format of PDF (Portable Document Format) or EMF (Enhanced Metafile).

4. A print setting method in a document processing server on which an application that processes document data under instructions from a client device runs and on which the document data is managed, comprising:
an acquiring step of acquiring print environment information about an outputting print device specified according to a print instruction for the document data from the client device, wherein the print environment information includes identification information of the outputting print device and print setting capability information;
a sending step of sending the acquired print environment information to a print setting server;
a receiving step of receiving, from the print setting server, print setting information acquired by the print setting server providing advanced print setting screen data corresponding to the print environment information to the client device; and
an outputting step of outputting the document data instructed to be printed and the received print setting information for printing with the outputting print device,
wherein each of print setting servers is provided by a different one of a plurality of print device manufacturers, and
the sending step refers to the identification information for identifying a print setting server provided by a manufacturer of the outputting print device included in the print environment information and sends the print environment information to the identified print setting server from the print setting servers.

5. A non-transitory computer-readable medium which stores a program for causing a computer to execute the method according to claim 4.

6. A print system comprising a client device, a document processing server on which an application that processes document data under instructions from the client device runs and on which the document data is managed, and a print setting server,
the document processing server comprising:
an acquiring unit which acquires print environment information about an outputting print device specified according to a print instruction for the document data from the client device, wherein the print environment information includes identification information of the outputting print device and print setting capability information;
a sending unit which sends the acquired print environment information to the print setting server;
a receiving unit which receives, from the print setting server, print setting information acquired by the print setting server providing advanced print setting screen data corresponding to the print environment information to the client device; and
an outputting unit which outputs the document data instructed to be printed and the received print setting information for printing with the outputting print device,
wherein each of print setting servers is provided by a different one of a plurality of print device manufacturers, and
the sending unit refers to the identification information for identifying a print setting server provided by a manufacturer of the outputting print device included in the print environment information and sends the print environment information to the identified print setting server from the print setting servers,
the print setting server comprising:
a receiving unit which receives the print environment information about the outputting print device from the document processing server;
a providing unit which provides the advanced print setting screen data corresponding to the print environment information to the client device; and
a supplying unit which supplies, to the document processing server, the print setting information entered through an advanced print setting screen displayed on the client device according to the advanced print setting screen data,
wherein, using the advanced print setting screen, an advanced print setting can be set depending on the specified outputting print device, and the advanced print setting cannot be set using a common print setting screen provided to the client device by the document processing server.

7. The print system according to claim 6, wherein the application running on the document processing server is a Web application that processes the document data under instructions provided through a Web browser on the client device.

8. A print setting method in a print system comprising a client device, a document processing server on which an application that processes document data under instructions from the client device runs and on which the document data is managed, and a print setting server, comprising:
in the document processing server,
an acquiring step of acquiring print environment information about an outputting print device specified according to a print instruction for the document data from the client device, wherein the print environment information includes identification information of the outputting print device and print setting capability information;
a sending step of sending the acquired print environment information to the print setting server;
a receiving step of receiving, from the print setting server, print setting information acquired by the print setting server providing advanced print setting screen data corresponding to the print environment information to the client device; and
an outputting step of outputting the document data instructed to be printed and the received print setting information for printing with the outputting print device,
wherein each of print setting servers is provided by a different one of a plurality of print device manufacturers, and
the sending step refers to the identification information for identifying a print setting server provided by a manufacturer of the outputting print device included in the print environment information and sends the print environment information to the identified print setting server from the print setting servers; and
in the print setting server,
a receiving step of receiving the print environment information about the outputting print device from the document processing server;
a providing step of providing the advanced print setting screen data corresponding to the print environment information to the client device; and
a supplying step of supplying, to the document processing server, the print setting information entered through an advanced print setting screen displayed on the client device according to the advanced print setting screen data, wherein, using the advanced print setting screen, an advanced print setting can be set depending on the specified outputting print device, and the advanced print setting cannot be set using a common print setting screen provided to the client device by the document processing server.

* * * * *